C. F. NORRIS & P. J. HICKEY.
Bung for Barrels.

No. 165,360.  Patented July 6, 1875.

WITNESSES
Henry N. Miller
C. L. Evert

INVENTOR
C. F. Norris & P. J. Hickey
By Alexander Mason
Attorney

N. PETERS, PHOTO-LITHOGRAPHER, WASHINGTON, D.C.

UNITED STATES PATENT OFFICE.

CHARLES F. NORRIS AND PETER J. HICKEY, OF NEW YORK, N. Y.

IMPROVEMENT IN BUNGS FOR BARRELS.

Specification forming part of Letters Patent No. 165,360, dated July 6, 1875; application filed June 8, 1875.

*To all whom it may concern:*

Be it known that we, CHARLES F. NORRIS and PETER J. HICKEY, of New York, in the county of New York, and in the State of New York, have invented certain new and useful Improvements in Bungs for Barrels; and do hereby declare that the following is a full, clear, and exact description thereof, reference being had to the accompanying drawings and to the letters of reference marked thereon, making a part of this specification.

The nature of our invention consists in the construction and combination of a bung for barrels, and a casing, the two so formed that the casing can be secured in the barrel, and the bung secured in the casing and tightened or loosened at will, as will be hereinafter more particularly described.

Figure 1:
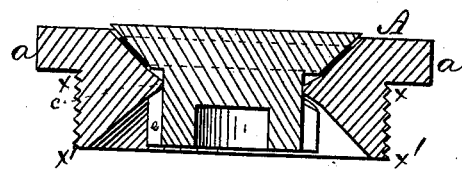
Figure 2:
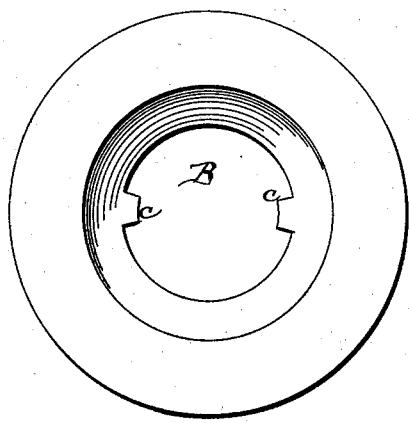
Figure 3:
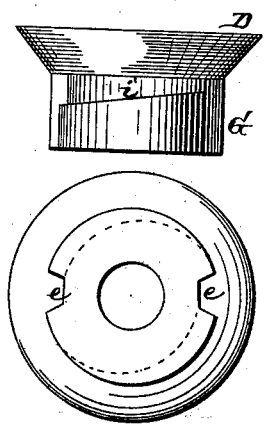

In the annexed drawings making part of this specification, Figure 1 represents a cross-section; Fig. 2, a plan view of the casing, and Fig. 3 a bottom and side view of the bung.

In the figures, A represents the casing or shell, which is made of metal, with a flanged top, $a$, and screw-thread $d$, upon its barrel, as seen from $x$ to $x'$. This casing is inserted in an opening in the barrel or keg, and screwed in tight until its flange $a$ either rests upon the outside or in a countersink made to receive it. This casing is provided with an opening, B, into which the bung is inserted. This opening is provided with two lugs or teeth, $c\ c$, as seen, which take into slots or openings $e\ e$ in the bung. The casing A is formed with a flaring mouth. D represents the bung, which has a beveled head, as seen, to fit in the flaring mouth of the casing. On the body or barrel G of the bung are formed two slots, $e\ e$, for the purpose above set forth. These slots open at their tops into a partial thread, $i$, cut around the barrel or body of the bung. When the bung is inserted in the casing so far that the lugs $c\ c$ will reach the partial screw-thread $i$, the bung is given a partial rotation. This catches the lugs in the thread $i$, and tightens and screws the bung in place. We prefer to use a rubber packing-ring between the head of the bung and the flaring mouth of the casing to insure a tighter joint.

By having the casing with a flaring mouth, and the bung D with a beveled head, as the parts are connected together they act on the principle of a wedge, the bung being drawn on an incline down into the casing and forming a liquid-tight joint.

Having thus fully described our invention, what we claim as new, and desire to secure by Letters Patent, is—

The casing A, provided with a flaring mouth and lugs $c\ c$, in combination with the bung D, having a beveled head, barrel G, slots $e\ e$, and partial threads $i\ i$, all constructed substantially as and for the purposes herein set forth.

In testimony that we claim the foregoing we have hereunto set our hands this 11th day of May, 1875.

CHARLES F. NORRIS.
    PETER J. HICKEY.

Witnesses:
  CHARLES NETTLETON,
  WILLIAM H. CLARKSON.